Dec. 30, 1952  R. BIRMANN  2,623,357
GAS TURBINE POWER PLANT HAVING MEANS TO COOL AND MEANS TO
COMPRESS COMBUSTION PRODUCTS PASSING THROUGH THE TURBINE
Filed Sept. 6, 1945  11 Sheets-Sheet 8

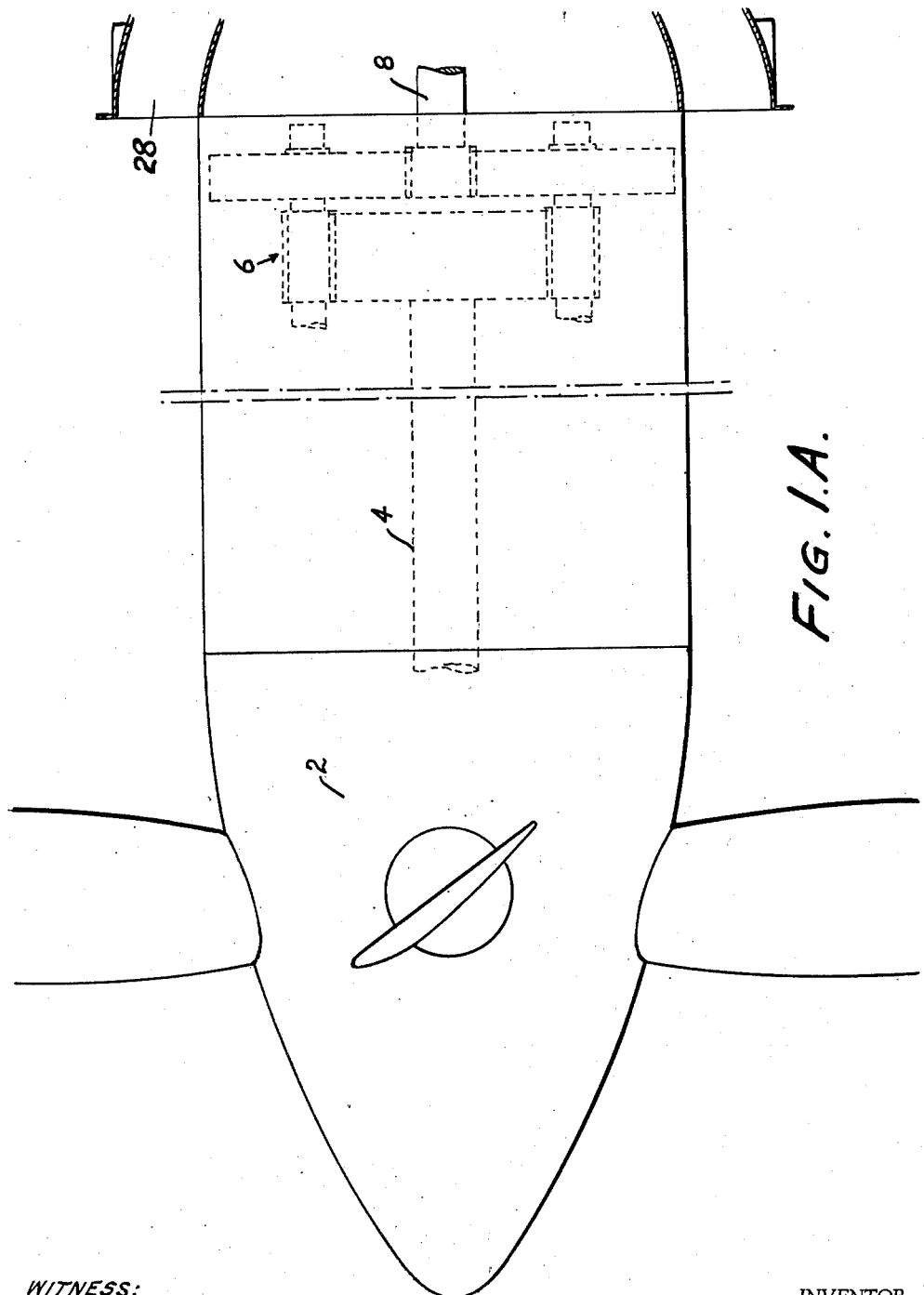

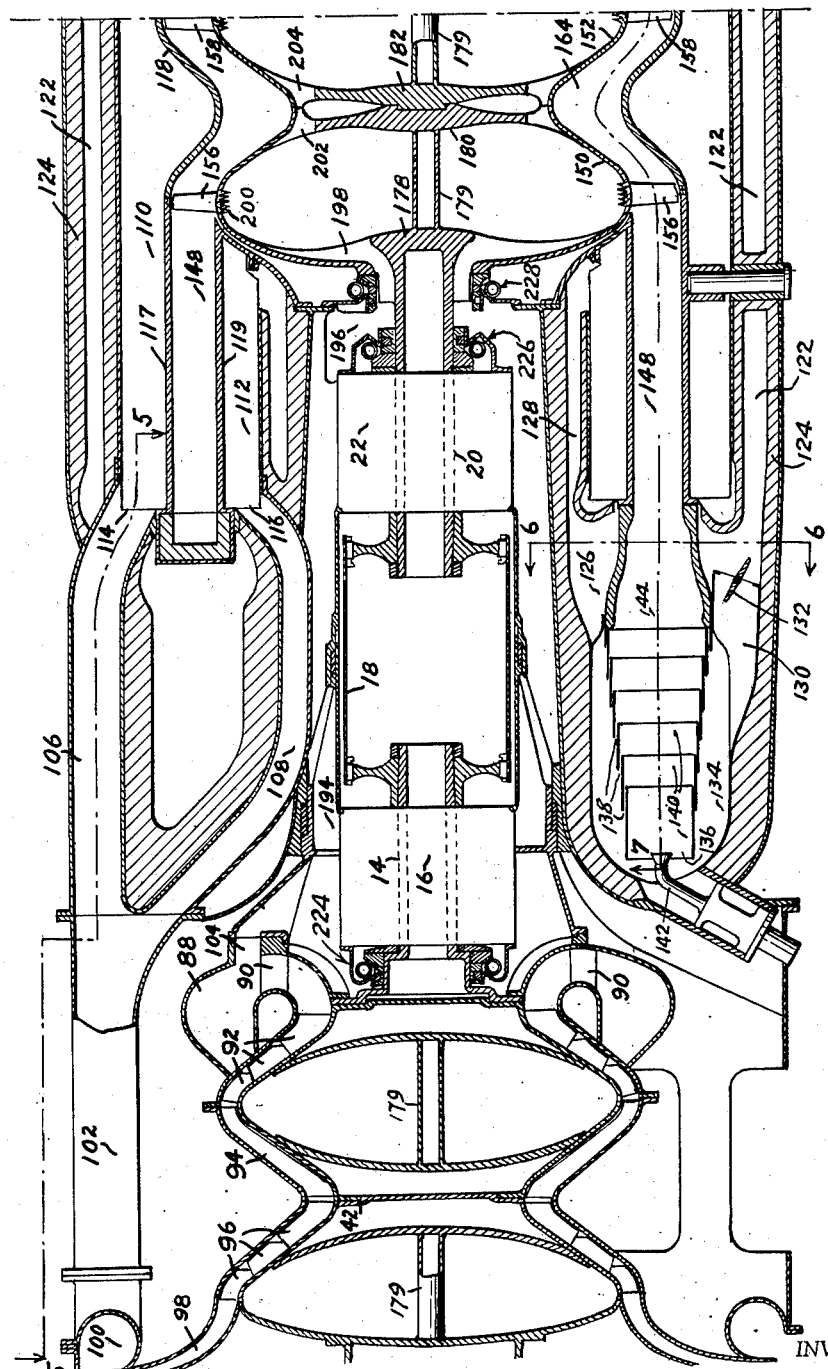
FIG. IC.

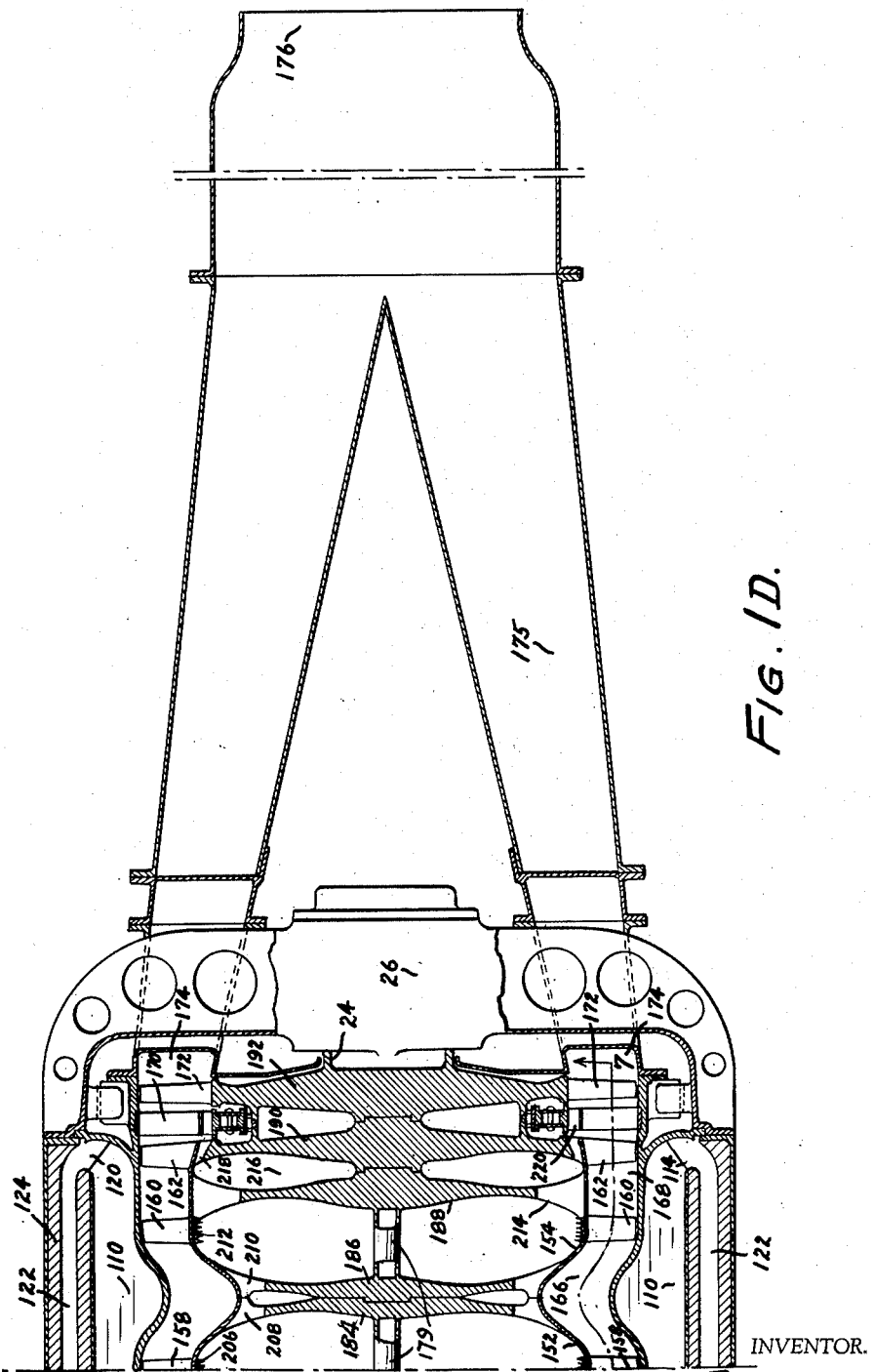

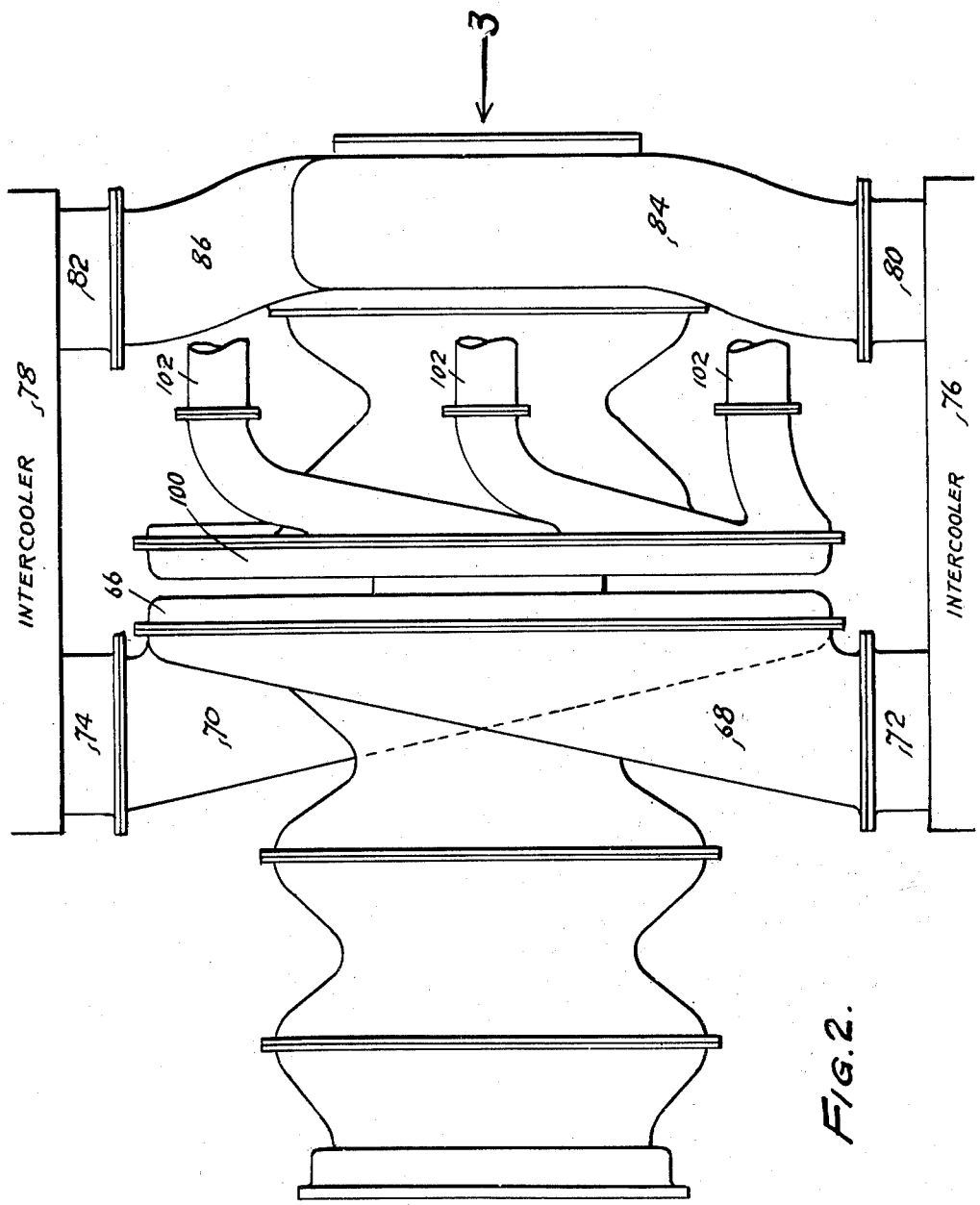

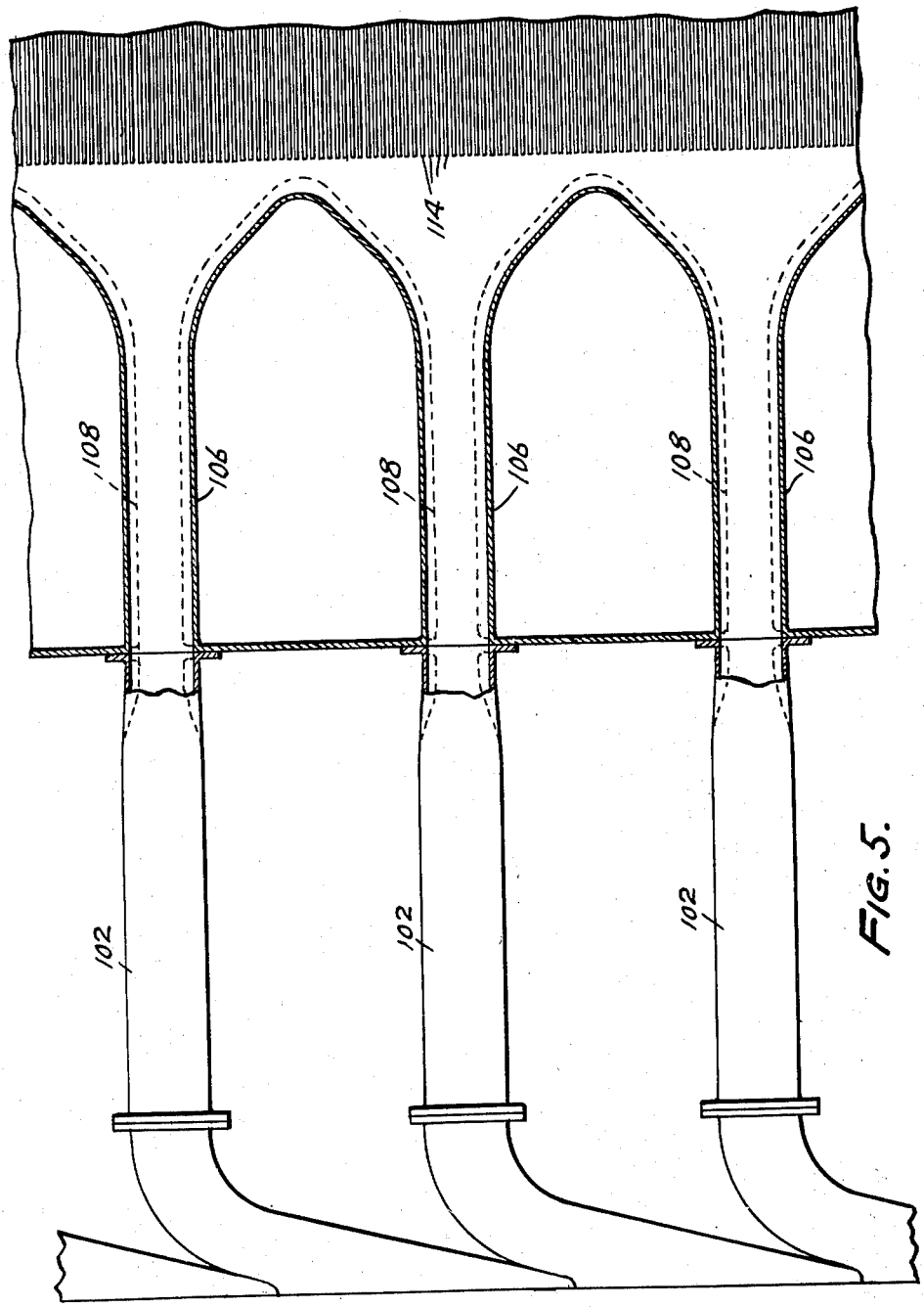

WITNESS:
Rob R Mitchel

INVENTOR.
Rudolph Birmann
BY
Busser Hardy
ATTORNEYS.

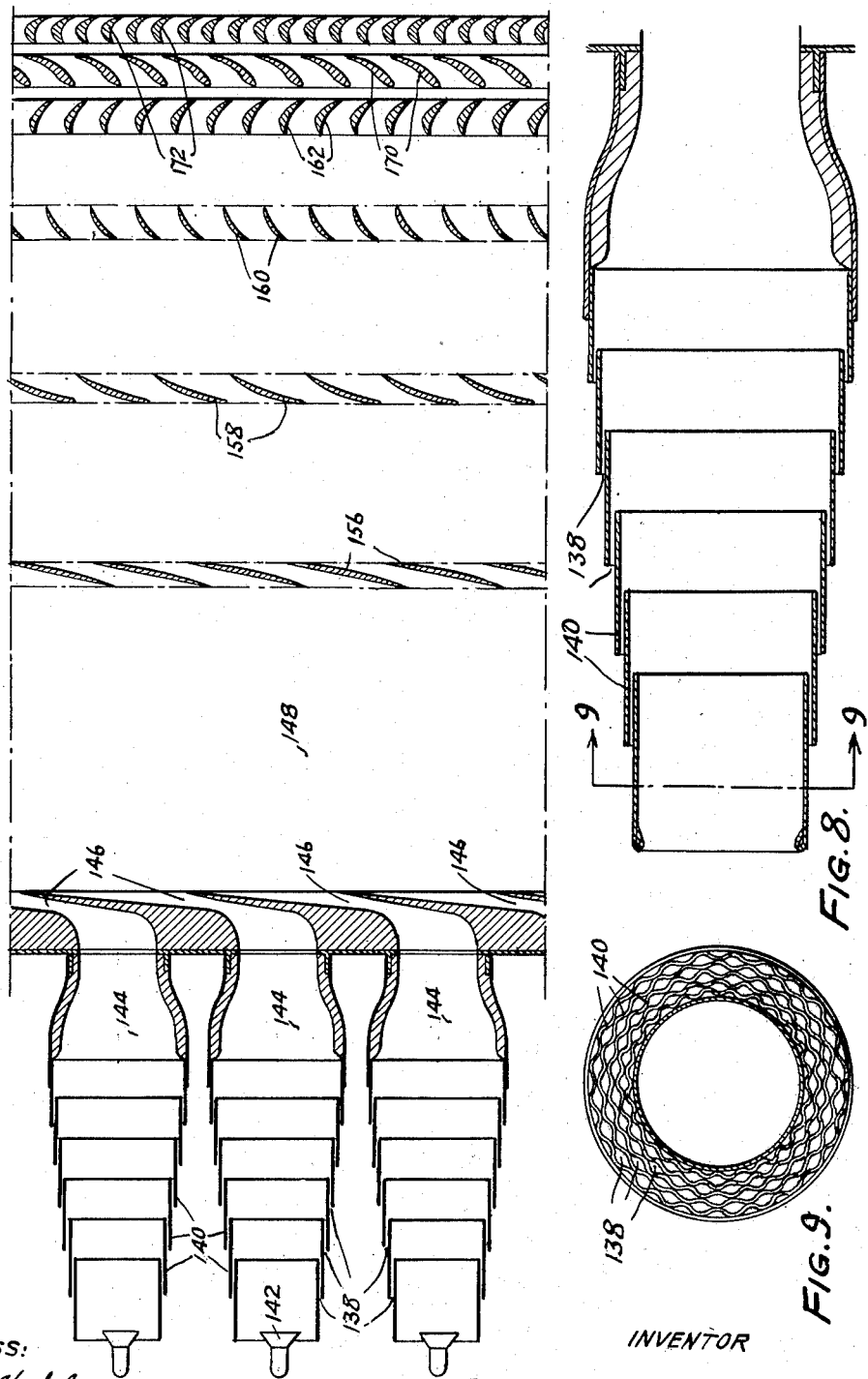

Dec. 30, 1952 R. BIRMANN 2,623,357
GAS TURBINE POWER PLANT HAVING MEANS TO COOL AND MEANS TO
COMPRESS COMBUSTION PRODUCTS PASSING THROUGH THE TURBINE
Filed Sept. 6, 1945 11 Sheets-Sheet 10

INVENTOR
Rudolph Birmann
BY
ATTORNEYS.

WITNESS

Patented Dec. 30, 1952

2,623,357

UNITED STATES PATENT OFFICE 2,623,357

GAS TURBINE POWER PLANT HAVING MEANS TO COOL AND MEANS TO COMPRESS COMBUSTION PRODUCTS PASSING THROUGH THE TURBINE

Rudolph Birmann, Newtown, Pa.

Application September 6, 1945, Serial No. 614,791

13 Claims. (Cl. 60—39.51)

This invention relates to gas turbine power plants. Particularly the invention has reference to a power plant utilizing a novel thermodynamic cycle and to the elements of such power plant whereby high efficiency of the cycle is achieved.

One object of the invention relates to the provision of the new cycle. This, in contrast to cycles heretofore known, involves the utilization of considerably less air per net brake horsepower output, with the result that the heat energy introduced is more efficiently converted into mechanical, and in certain cases additional jet energy, by minimizing the air flow proportionately used, the quantity of which air flow for a given power output involves proportional losses in a compressor and turbine even though a large compressor and a large turbine may be as efficient or more efficient than small ones. Further, the thermodynamic efficiency is greatly improved in that expansion of the gases takes place through unusually great temperature and pressure drops. Other features of this cycle will become apparent hereafter.

Another object of the invention relates to a novel turbine, not only, in its preferred form, capable of efficiently utilizing extremely high velocity flow of driving gases, but of operating with a pressure rise through, at least, several stages thereof whereby certain important features of the improved cycle are realized, though the turbine is of more general use. The turbine further embodies certain structural features, cooling provisions, etc. which constitute additional objects of the invention.

Another object of the invention relates to the provision of improved heat exchange means for the cooling of high temperature gases flowing at extremely high velocities, the cooling taking place with a minimum loss of kinetic energy.

These and other objects of the invention particularly relating to details will become apparent from the following description read in conjunction with the accompanying drawings in which:

Figures 1A to 1D, inclusive, are successive views partly in axial section of the parts of the improved power plant taken in order from its forward to its rearward end;

Figure 2 is a side elevation of the compressor showing in particular its various connections to an intercooler and its air delivery connections to the air heating means;

Figure 5 is a developed view of a section taken on the surface of revolution indicated at 5—5 in Figure 1C showing in particular the air passages from the compressor to the heat exchanger and the arrangement of fins therein;

Figure 7 is a developed view of a section taken on the surface of revolution indicated at 7—7 of Figures 1C and 1D and showing in part the arrangement of the combustion chambers, nozzles, the whirl chamber, and the moving and stationary vanes of the turbine;

Figure 8 is an enlarged sectional view of the flame tube of the combustion chamber which is shown only diagrammatically elsewhere;

Figure 9 is a transverse section taken on the plane indicated at 9—9 in Figure 8;

Figure 1B:
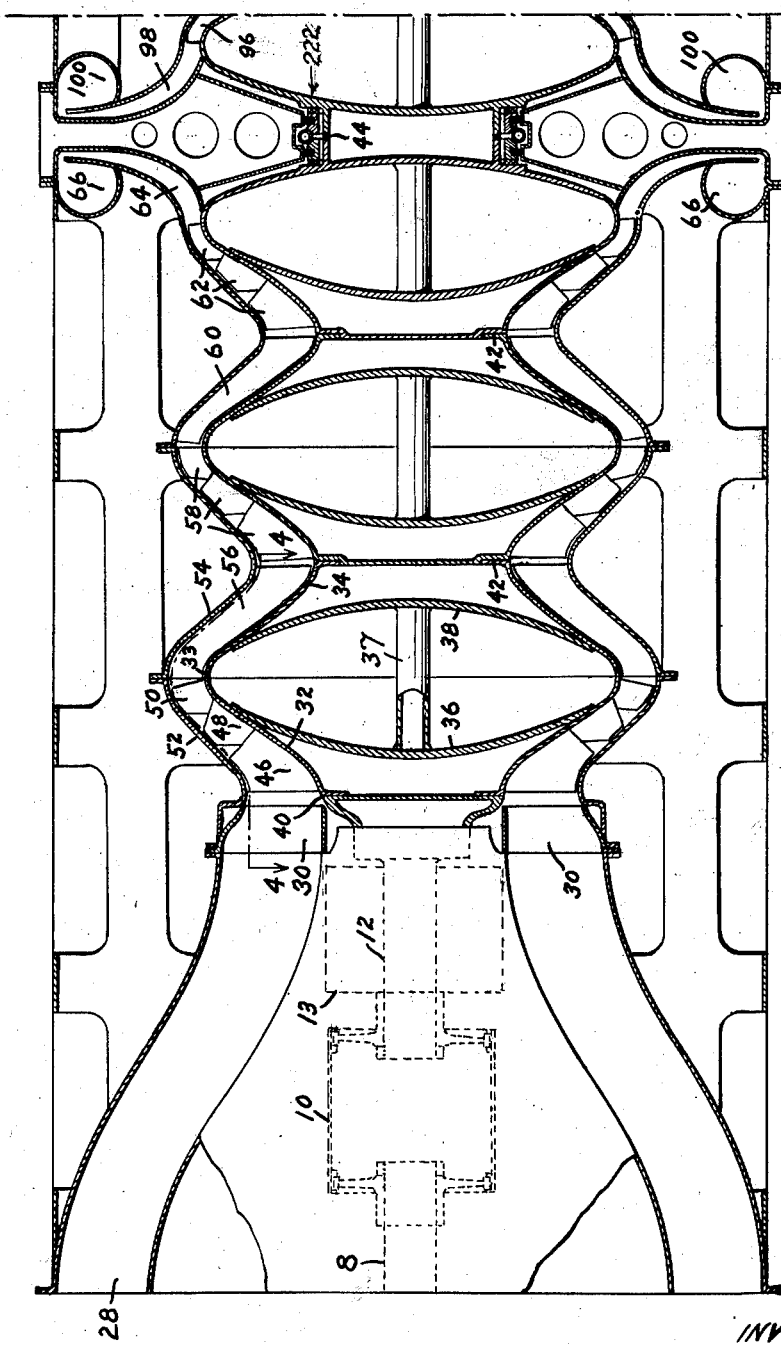
Figure 3:
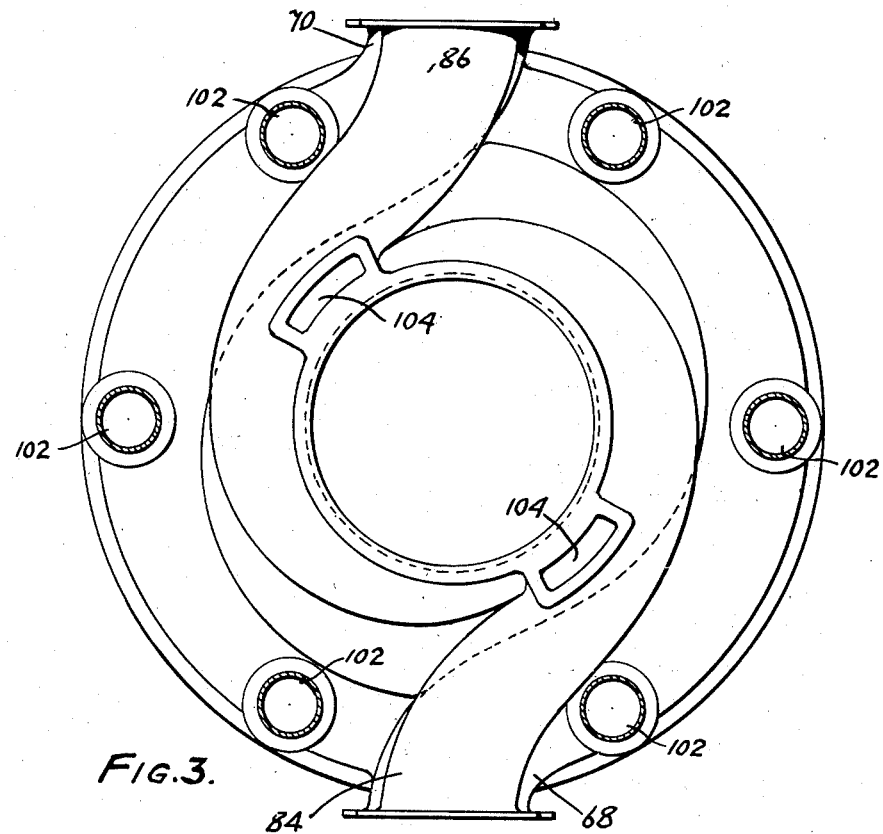
Figure 3 is an end view of the compressor unit looking in the direction of the arrow 3 in Figure 2.

There will first be described the general mechanical features of the improved power plant, following which the design of certain elements and the operation will be described.

Generally stated, the power plant comprises a turbine connected to drive both a compressor and a propeller, the compressor furnishing the air for combustion of fuel to provide the turbine driving gases.

The shaft 4 of the propeller spinner 2 which carries the propeller blades is driven through reduction gearing 6 by the shaft 8 connected through flexible coupling 10 to the shaft 12 mounted in a bearing 13, which shaft 12 serves as the forward mounting of the compressor rotor. The rear mounting of the compressor rotor is through the medium of a shaft 14 supported by a bearing 16. A flexible coupling 18 connects shaft 14 with the shaft 20 of the turbine, which shaft is mounted in a bearing 22. The turbine at its rear end is provided with a shaft extension 24 mounted in a bearing 26.

Air is led to the compressor through the passage 28, which, in the case of aircraft applications, may receive its air through wing slots or other openings directed forwardly to take advantage of the ram effect of movement through the air, which thereby gives rise to an initial pressure and/or velocity of approach to the compressor. Immediately in front of the first compressor stage, stationary vanes 30 are provided to impart spin to the air for proper reception by the compressor. The compressor operates on the principle of vortex flow and in such fashion that at its inlet at any radius the peripheral component of the absolute velocity of the air is inversely proportional to the radius. The vanes 30 are accordingly designed in the same general fashion as the spin-imparting vanes at the inlets of conventional axial flow compressors to produce a vortex flow having the characteristics just mentioned. The proportionality constant of this flow is the same or substantially the same for rated conditions as the proportionality constant at the inlet of the first stage impeller. In this fashion, smooth entrance, without loss, into the impeller is assured. The vanes 30 should be designed to be of airfoil cross-section in accordance with good aerodynamic principles to secure spin of the air without burbling and without impact losses.

The compressor illustrated comprises five stages. The first three are in direct series and located back to back with respect to the last two which are also in direct series with each other. Except for the radial dimensions of the passages and the vane heights, the various compressor stages are identical and in particular the impeller hubs are identical, except for the outlet portions of the third and fifth stages. The hubs comprise annular shells 32 and 34, providing, as the inner boundaries of the air passages, surfaces of revolution. These shells are welded together as indicated at 33 and in series with each other as indicated at 42. In order to impart the necessary mechanical strength, each hub section is provided with a dished disc element 36 or 38 welded to the peripheral portions of the hub shell. The shape of these disc elements is such as to secure maximum tensile strength and rigidity against distortion at high speeds of operation. In accordance with this, these disc elements are approximately of a shape which would naturally be assumed by a flexible loaded surface having junction to an axis of rotation at spaced points and subjected to centrifugal forces, i. e., a shape which might be described as a three dimensional catenary, the axial section of which approximates a parabola or catenary. In order to secure rigidity against axial displacement cylindrical struts 37 join the disc elements 36 and 38.

The joined hub sections of the third and fifth stages are provided with shaft-like extensions welded together as indicated at 44 and are surrounded by a seal 222 of a type hereafter described which maintains separation of the outlet pressure regions of the third and fifth stages.

Figure 4:
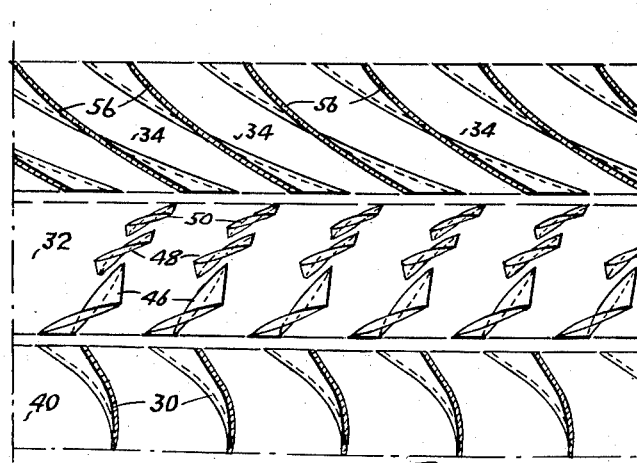
Figure 4 is a cylindrical development of a section taken on a surface of revolution immediately inside the casing, looking inwardly between the arrows 4—4 in Figure 1B, and showing in particular the stationary and rotating vanes of the first compressor stage.

As will become apparent hereafter, the vanes of each impeller could theoretically be continuous from their inlet to their outlet portions. However, to secure the proper flow characteristics this would mean that except for some particular radial section, they would deviate very substantially from a radial direction and hence be subject to very large deflecting stresses during high speed operation. Accordingly it is desirable to break up the vanes into a series of groups of axially shorter vanes as indicated in Figures 1B and 4. A series of vanes 46 is thus provided at the inlet, a second series 48 is provided to define the intermediate portions of the flow passages, and a third series 50 is provided at the outlet. When vanes of this character are used it becomes possible to provide in the case of each vane a strictly radial section in some particular radial plane, while the remaining portions of the vane fore and aft of this radial section do not deviate too greatly from a radial condition and will thus be subject only to low non-destructive stresses. In general, it may be said that the vanes lie along theoretical skew surfaces and are of airfoil sections by annular surfaces taken in the direction of the flow stream.

The general appearance of these vanes will be evident from the cylindrical development illustrated in Figure 4. They are such as to maintain substantially theoretically proper flow in any radial plane, being designed to secure the proper absorption of energy by the air from the rotating vanes.

The housing for the impeller comprises a portion 52 enclosing, with suitable clearance, the rotating vanes and a second portion 54, which carries the spin-reducing vanes 56, which latter vanes in turn have a suitable clearance with the hub. The vanes 56 are similar to the impeller vanes in the sense that they are designed to maintain substantially theoretically proper flow at any particular section, but are so designed that the spin component along any streamline decreases in the direction through their passages. The outlet ends of the impeller vanes and the inlet ends of the spin-reducing vanes are such as to give to the air flow the same proportionality constant of vortex flow so that the flow from the rotating impeller vanes to the stationary spin-reducing vanes is smooth. In the case of the spin-reducing vanes, it is not necessary to take into account centrifugal stresses and consequently each vane may be continuous from its inlet to its outlet. In any case, the spin-reducing vanes, both when single and when multiple, should desirably have airfoil characteristics in the direction of flow.

The description, given with respect to the first stage impeller, applies equally to the other impellers, the vane groups of which are indicated at 58, 62, 92 and 96. Likewise, the description given for the spin-reducing vanes is applicable to the similar vanes of the second and fourth stages indicated at 60 and 94. The sole difference involved, as may be noted from the drawing, is that the annular areas of the succesive compressors, i. e., the vane heights, are reduced to take into consideration the compression which occurs and which results in greater density of the flowing air and consequently, for the same velocity, a greater mass flow per unit annular area.

In the case of the third stage impeller, the air is to pass to an intercooler and consequently it is not necessary to cause the air to flow radially inwardly to the inlet of the next stage. Accordingly, the third stage impeller is provided with a vaneless diffuser passage 64 of conventional design except for the curvature in axial section which permits it to take the air flowing substantially without radial velocity and deflect it in a radial direction into the annular passage 66.

Referring to Figure 2, the air from the passage 66 is taken off tangentially through the connections 68 and 70 to the inlets 72 and 74 of intercoolers 76 and 78 of conventional air-cooled type, in which intercoolers it flows through suitable tubing in heat exchange with air taken in through openings in the aircraft wings or other openings and discharged from the intercooler to the atmosphere. The compressed air leaves the intercoolers at 80 and 82 and is delivered through the tangential connections 84 and 86 into the annular passage 88. From this annular passage the air flows through vanes 90 arranged to impart to it a vortex type of flow for proper impactless approach to the rotating vanes 92 of the fourth stage compressor. The fourth stage impeller delivers the air through the spin-reducing vanes 94 to the fifth stage impeller having the vanes 96, proper vortex flow being maintained throughout. The fifth stage impeller in turn delivers the air to a vaneless diffuser 98, similar to 64, which in turn communicates with the annular passage 100. Before passing from the discussion of the compressors, it may be pointed out that part of the air after passing through the intercooler is bled at 104 from the passage 88 for cooling purposes hereafter described.

From the annular or multiple scroll passage 100, the air flow is divided into a series of passages 102 each of which is in turn subdivided into an outer passage 106 and an inner passage 108 (see Figures 1C and 5). These passages respectively communicate with outer and inner pre-heating chambers 110 and 112. The outer pre-heating chamber is bounded on its inner side by the casing 117 of an annular gas flow passage and by the casing 118 of the turbine, the outer wall of the passage 110 being cylindrical. Extending axially through the chamber 110 and arranged in axial planes are a large number of fins 114, between which the air flows. These fins are metallically bonded to the casings 117 and 118 so as to provide maximum heat conduction from these casings through the fins to the air. The compressed air flowing through the passage 110 thus leaves at 120 highly heated.

The passage 112 is somewhat similar in that it is furnished with fins 116 similar to the fins 114, and having metallic connections to the inner cylindrical wall 119 of the combustion gas passage. Accordingly in this passage as in the passage 110, the air is substantially heated.

The air flowing from the passages 110 and 112 then flows forwardly through the passages 122 and 128, which are insulated as indicated at 124 to prevent loss of heat. These passages 122 and 128 communicate with a common annular passage 126, which is closed except for a series of inlets 130 individual to a series of combustion chambers and controlled by adjustable valves 132. The series of combustion chambers is provided about the circumference of the plant and comprises outer spaces 134 communicating with the inlets 130 into which spaces the air flows to pass inwardly to support combustion through the end opening 136 and a series of openings 138 provided by the nested corrugated cylindrical members 140, constituting a flame chamber, surrounding the axis along which fuel is projected from the fuel atomizing nozzle 142 (ignition being started in conventional fashion, not illustrated). This arrangement is such that the spray of fuel is burned progressively along its length by annular streams of air so that complete combustion occurs before there is reached the region 144, which is lined with ceramic material to withstand the intense heat. The members 140 are formed of heat-resisting alloy and are protected from the intense heat of the flame by reason of the annular flow of air passing through the spaces 138. The region 144 of each of the combustion chambers communicates with an individual ceramic nozzle 146, of some highly refractory material such as fused alumina or Carborundum designed to produce a transformation of the energy of the combustion products into high velocity, these nozzles being of the converging-diverging type as is customary to secure extremely high discharge velocity. The combustion gases thus enter the annular whirl chamber 148 between the cylindrical walls 117 and 119 at very high tangential velocity, desidably at an angle to the circumferential direction of about 10°, so as to circulate therethrough in advancing spiral fashion in their approach to the first series of turbine vanes in such fashion that the streamlines of flow make about one to one and a quarter complete revoltuions about the axis between the nozzles and the first set of turbine vanes. A greater number of revolutions may be made for more effective cooling, but at the expense of greater friction loss.

The inner surfaces of this whirl chamber are highly polished for smoothness and are oxidized or have their heat absorption increased in some other manner for reasons hereafter stated.

The turbine hub sections are indicated at 150, 152 and 154. These comprise shells formed as surfaces of revolution as indicated and carry the series of vanes 156, 158, 160 and 162, the particular nature and operation of which will be described hereafter. The spaces 164 and 166 between the vanes 156 and 158 and between the vanes 158 and 160 are annular in shape and as indicated have portions which, as viewed in Figures 1C and 1D, have less radii than the preceding and succeeding vanes. While this may seem to involve a rather sharp diversion of direction of flow, it is to be noted that the flow has a very high circumferential component and a relatively low axial component of flow so that, as a matter of fact, the radial diversion of the flow is very gradual in passing between the vanes. These regions are so shaped not only to provide mechanical strength, in that by their use the turbine hub portions 150, 152 and 154 may be shaped to secure the maximum mechanical strength necessary to withstand the centrifugal forces at the high temperatures which exist at the vanes, but also for a thermodynamic advantage hereafter described. In the case of the flow between the vanes 160 and 162, however, the temperature has already been sufficiently reduced so that this same necessity for extreme strength no longer applies. Furthermore, the whirl component is now quite low so that it would be difficult to cause the flow to flow inwardly and then outwardly without separation from the annular walls. Consequently the space 168 may be substantially cylindrical.

From the vanes 162, the gases pass through the redirecting stationary blades 170 and finally pass through the buckets 172 of a pressure stage, being discharged therefrom into the annular space 174 from which flow occurs through the tail passage 175 to a nozzle 176, from which the gases may issue to the atmosphere in the form of a relatively high velocity jet giving rise to a jet propulsion thrust.

Within the hub portions of the turbine there are provided discs 178, 180, 182, 184, 186, 188 and 190 as illustrated. These are so shaped (as described in connection with the impellers) and secured together as to provide the maximum strength for the support of the shell sections of the hub which are welded to these discs and to each other. Cylindrical struts 179 provide axial rigidity for the hub structure. The disc 192 carrying the buckets 172 is secured to the disc 190.

In order to provide cooling, the air, bled from passages 104 previously referred to, passes at 194 about the bearings 16 and 22 and the intermediate coupling 18, and thence into the passage 196 from which it flows through slots 198 in the member 178 into the space between discs 178 and 180. This air then passes through the slots 202, 204, 208, 210 and 214 in succession, thereby reaching the interior of the various cells inside the rotor. Finally, it enters into the space 216 between discs 188 and 190 and passes therefrom at high temperature through nozzles 218, which are so directed as to act as backwardly discharging converging-diverging nozzles so that their discharge enters inner extensions 220 of the stationary blading 170 in smooth fashion at high velocity, the pressure drop through the nozzles being considerably in excess of the critical pressure drop. This stationary blading acts to provide redirecting passages to direct the air through the root portions of the buckets 172 so that it aids the turbine rotation. It finally mingles with the combustion gases in the annular region 174.

In order to secure successful cooling of the vanes, which are welded into slots in the hub shells, there are provided inside the hubs as integral extensions of the vanes extended surface arrangements in the form of fins 200, 206, and 212 so that heat may be effectively conducted from the vanes in direct fashion. These fins are milled in an angular direction so that smooth flow occurs through them, the air passing substantially axially relative to the rotor through the slots 198, 202, 204, 208 and 210 so that relative rotary flow occurs as the air flows outwardly from the slots into the region of the fins.

Figure 10:
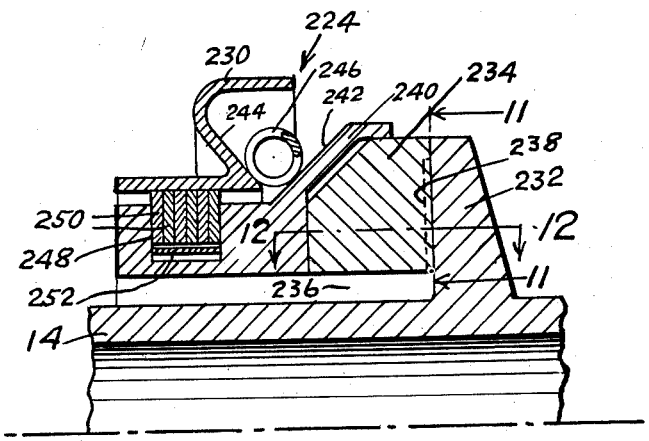
Figure 10 is an enlarged sectional view showing an air seal such as used in various positions in the plant.
Figure 11:
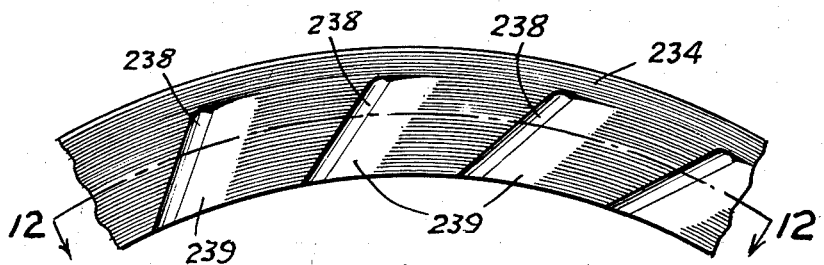
Figure 11 is a fragmentary section taken on the radial plane indicated at 11—11 in Figure 10.
Figure 12:
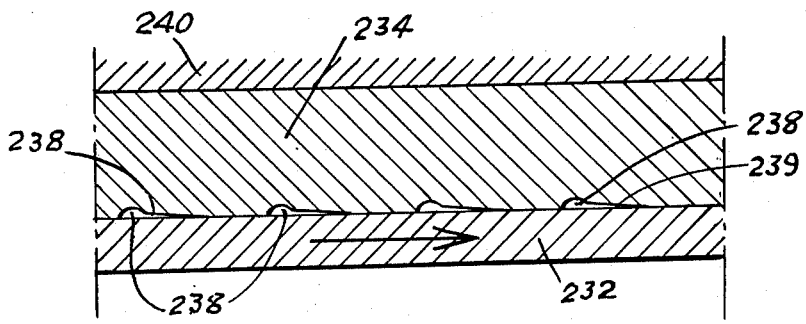
Figure 12 is a development on the section taken on the cylindrical surface indicated at 12—12 in Figures 10 and 11.

At various points in the power plant necessity arises for sealing the junction of relatively rotating parts against pressure differences. Sealing means is provided at such places as indicated at 222, 224, 226 and 228. There will now be described a typical sealing means which by modification of form may be used at these various points. Specifically, the sealing means at 224 will be described with reference to Figures 10, 11 and 12.

A stationary partition is indicated at 230 on the left side of which a high pressure exists and on the right side of which a low pressure exists. The shaft 14 is provided with a flange 232 having a radial plane face against which bears the radial plane face of a carbon ring 234, this ring being spaced from the shaft at 236, the dimension of which space is considerably exaggerated in Figure 10. The right hand face of the carbon ring is provided with a series of grooves as indicated at 238 extending in the direction of logarithmic spirals and communicating with wedge-like depressions or pockets 239, the wedge angle of which is very slight, for example, of the order of a quarter to a half degree. The ring 234 is mounted in a metal ring 240 which is provided with a conical face 242 opposed to a conical face 244 on the partition 230. An annular helical spring (a so-called garter spring) 246 is tensioned to react between these wedge-shaped surfaces so as to urge the member 240 and the carbon ring 234 to the right under slight pressure. An annular groove 248 in the member 240 carries a series of piston rings 250 which bear against a cylindrical surface of the partition 230 under the pressure of a corrugated circular spring indicated at 252.

The arrangement of the elements just described is such that an air film is maintained for lubrication purposes between the carbon ring and the flange 232. Air rotating at high velocity enters the grooves 238 aided by centrifugal forces and is then distributed into the wedge-shaped space 239, passing as a film from its trailing edge. By reason of the wedge effect this air film is continuously maintained, being of a thickness of only a small fraction of a thousandth of an inch. The leakage from the inside to the outside of the relatively moving surfaces is accordingly very slight. In order to maintain this film in a proper condition for lubrication it is necessary that the pressure of the carbon ring toward the flange be low and of predetermined value depending solely upon the spring force. This condition is achieved by the proper area relationships. The high pressure forces the assembly of the rings 234 and 240 to the right. At the same time a force is exerted to the left by the pressure of the air film which has a gradient ranging from the high pressure at the inside, i. e., the clearance 236, to the low pressure at the outside. By making the bearing area of the carbon ring of proper larger size than the area presented to the high pressure the arrangement is balanced to the extent of the pressure difference so that the bearing pressure is substantially solely due to the action of the spring 246. In this fashion an effective seal is maintained with very little friction. The high speed of rotation provides an air film of excellent lubricating qualities despite the low viscosity of the air and the normal absence of any lubricating qualities of an air film. Only at very low speeds of operation, as, for example, in starting up the system, will there occur actual contact between the carbon ring and the flange.

As will be apparent hereafter, the invention contemplates for best operation an extremely high supersonic velocity of approach of the driving gases to the turbine. It is obvious that conventional turbines are inadequate to meet this situation. Not only would their efficiency be extremely low in view of the high gas velocity as compared with the permissible peripheral velocity for entrance into conventional buckets, but an extreme pressure change would necessarily occur in inefficient fashion in conventional buckets, causing, in particular a temperature rise which would exceed the permissible temperature for the buckets. In addition, there is desirably secured in the rotating turbine blading a pressure rise from inlet to outlet as will be discussed hereafter in reference to the cycle. Conventional turbines operate with an overall pressure drop in the rotating blading having a limit of zero in the case of impulse turbines.

In the case of the improved turbine the vanes 156 of the first set are airfoils of the type designed for efficient operation at supersonic velocities and are designed to reduce the velocity to sonic or slightly less than sonic velocity. In the case of a set of vanes such as at 156 designed to receive the air at supersonic velocities the passages between the vanes are very important. Deceleration is always connected with compression shock, but it has been found that with proper shape and proportion of passages, deceleration from a Mach number of 1.5 to a Mach number of 1.0 may be very efficiently secured, e. g. with an efficiency of 93%. The vanes should be arranged as illustrated in Figure 7. They are characterized by their provision of passages involving a relatively slight contraction ratio of about 1.1 for a Mach number reduction from 1.5 to 1, deflection of the flow from an average inlet angle of about 15°, proper for reception of the spinning approaching gas, to an average outlet angle of about 13°, sharp leading and trailing edges, and relatively slight convexity with maximum thickness in the mid-chord vicinity, the location of the maximum thickness and the general blade section being determined from the point of view of the passages and that of designing the vanes as compression shock control devices rather than from the point of view of supersonic airfoils.

In view of the substantial reduction of Mach number, there occurs therein a very considerable part of the total compression taking place in the negative-reaction blading. Furthermore, these vanes contribute substantially to the mechanical work output of the turbine by reason of causing a deceleration of the supersonic flow rather than by reason of the deflection thereof.

Since the vanes 156 receive gas having a vortex flow through the whirl chamber, they should have a twist so as to receive the vortex flow smoothly and also to discharge the flow in the form of a vortex for properly stable flow through the space 117 and to the second set of vanes.

The velocities of approach to the second set of vanes will be sonic or less, and accordingly these vanes 158 are designed for such velocities. They may take the form illustrated, having slender inlet sections with only slightly rounded inlet edges, and having either a straight or slightly curved mean thickness line to secure a relatively slight deflection of the flow; e. g. for an average inlet angle of 13° to an average outlet angle of 17°, and providing diverging passages, the equivalent cone divergence angle of which is of the order of 2° to 4°. These vanes 158 are also twisted to receive and deliver vortex flow.

Usually the gases approaching the third set of vanes will have substantially subsonic velocities and accordingly the airfoil vanes 160 may be designed to correspond thereto, with rounded entrance, quite substantial camber, and with maximum thickness slightly ahead of the center. The relative velocity of discharge may, in the case of these vanes, be almost axial. These vanes, also, are twisted to receive and deliver vortex flow.

The fourth set of vanes 162 are also of subsonic twisted type and serve to deflect the flow rearwardly relative to the rotor to such extent that the total deflection from inlet to outlet of the turbine may be of the order of 100° or more. This high total deflection which could not possibly be secured efficiently by means of single buckets of a conventional turbine at the velocities involved can be achieved at very high efficiency by the use of the multiple airfoil cascade described.

It may be noted that while, as illustrated, the deflection is carried well beyond an axial direction of relative flow, this in some cases may not be desirable inasmuch as less net pressure rise will occur. For extremely high initial temperature it may be desirable to secure the maximum degree of expansion through the nozzles, hence in such case the flow relative to the blading may not be carried beyond an axial direction.

Considering the turbine constituted by the blades 156 to 162, it will be evident that the substantially constant blade height which exists in the preferred form of the invention is necessarily tied up with such deceleration of the flow, without expansion, that the flow must take place with a pressure rise. This is in contrast to the reaction type of turbine which involves a positive pressure drop and to the impulse type of turbine involving a zero pressure drop. For convenience of reference, therefore, the present turbine will be designated by the apt term "negative-reaction turbine" with the understanding that this refers to a turbine such as that described involving a pressure rise, i. e., a compressor action.

It may be noted that constant blade height is preferred only from the point of view that the initial vortex flow is advantageously designed with the smallest possible helix angle, resulting in the maximum permissible vane height from the point of view of strength, i. e., the inlet angles of the vanes should be minimum. If other considerations than strength were involved, the vane heights should increase towards the discharge.

It will be evident from the principles of thermodynamics that the compression occurring in the turbine must necessarily be accompanied by a rise of temperature. If, therefore, the gases leave the vanes 156 at the highest permissible temperature for the materials and construction thereof, it will be evident that the subsequent vanes would be heated above permissible temperatures unless provision was made for the removal of heat during the compression. As a matter of fact, the passage of the gases through the turbine is accompanied by a very effective heat removal to the end that the process through the turbine may be kept essentially isothermal. The portions of the housing between the rows of vanes are desirably polished just as in the case of the whirl passage 148 so that heat dissipation by vortex cooling takes place even though the circumferential velocity of flow decreases through the vanes.

In the vortex cooling in the whirl chamber and between the sets of vanes, the flow is subjected to a centrifugal field which is of major value in securing good heat transfer. The centrifugal acceleration is of the order of 500,000 times the acceleration due to gravity. The extremely high velocities result in high Reynolds numbers and consequently high Nusselt numbers corresponding to high rates of heat conduction from the flow to the walls. The conditions for heat radiation from the gases to the walls are also ideal due to the existence of large gas masses of considerable radial and axial depth, relatively low rate of axial movement of these gas masses, and excellent geometrical conditions for high radiation due to the curvature of the walls, and, in the case of the interblade spaces, due to the deep dips of the passages.

The centrifugal field also contributes to a great degree to the heat transfer. Due to the high acceleration, convection forces of great magnitude are involved (as compared with the usual slight ones due to gravity alone). As an ultimate result heat transfer rates are substantially increased without resulting in a proportional increase of friction losses.

The conditions are also such to provide an ideal situation for radiation of heat from the vanes. It will be noted in particular that in the case of the vanes 156 and 158, through which the major slowing down of the flow occurs and in which, accordingly, the maximum liberation of heat occurs, their aspect is such that major proportions of the normals to the surface of any vane do not substantially meet any other vane so that radiant energy may pass therefrom directly to the quite cool housing of the turbine and to the cooled rotor surfaces. The dips in the housing and rotor surfaces between the sets of vanes serve to receive this radiation and absorb it very effectively. For this purpose these surfaces are oxidized or otherwise blackened or their heat absorption increased in some other manner. Additionally, heat is also transferred by conduction from the vanes to the interior extended surface at 200, 206 and 212. This extended surface is very effectively cooled by the air within the turbine shell, the action being particularly augmented by the centrifugal effect on the air which causes its normal flow to take place toward the periphery with a relative circumferential velocity, there existing here also vortex cooling as described above. As a result of these very effective fashions in which heat is removed the compression which occurs is maintained from an overall standpoint substantially isothermal.

The residual leaving velocity of the gases from the vanes 162 is turned into use by being directed through the blading 170 into the blading 172 of an additional turbine, the velocities now being sufficiently low that a turbine of more nearly conventional type is satisfactory. The stationary blading 170 is designed to receive and deliver vortex flow, being twisted in a fashion which will be clear from the discussion of the compressor. Since the discharge angle of the vanes 162 is large, little or no turning is required in the guide vanes 170, this condition contributing substantially to the efficiency. The blading 172 is twisted in accordance with vortex requirements so that pure impulse action exists at the base of the blades with reaction of the order of 50% at the blade tips. The final leaving velocity of the gases, now traveling with little, if any, peripheral component of flow, may be utilized directly in the form of a jet, or if operation is carried out under certain conditions as, for example, at high altitude, a pressure drop through the outlet nozzle 176 may serve to give rise to further jet thrust.

The interior cooling air enters at high pressure the vanes 218 which form converging-diverging nozzles to produce high velocity jets to create a substantial reaction aiding rotation of the turbine. The redirecting blades 220 for this air direct it to the blades 172 of the final turbine, between the innermost sections of which blades this air flows to aid in driving the same. The redirectiing nozzles provide vortex flow so that this prevails throughout the height of blades 172.

Having now described the turbine, the overall cycle of operation may be described.

The compression of air in the first three stages of the compressor is substantially adiabatic, the deviation from adiabatic compression being due to losses in the compressor. This air is then cooled in the intercooler at approximately constant pressure. The temperature of the compressed air is reduced in the intercooler to a temperature somewhat above the temperature of the atmospheric air which absorbs the heat of the compressed air. In the last two compressor stages there is again approximately adiabatic compression with the resulting attainment of a final quite high pressure ratio achieved in efficient fashion.

The heating of the air which has been compressed now occurs in two general stages. The first stage is involved in the passages 110 and 112 at approximately constant pressure. While the air has, compared with the combustion gases, relatively low flow velocities, nevertheless, the heat transfer is very effectively carried out in view of the extensive surface afforded by the fins 114 and 116 and the high density of the compressed air. This surface may be, for example, of the order of fifteen to twenty times the area of the surface exposed to the gases in the whirl passage 148. The highly heated air then flows through the insulated passages 122 and 128 to the combustion chamber.

In the combustion chamber the air is further heated at substantially constant pressure to an extremely high temperature. The relation of the air to the fuel is such as to secure complete combustion with only such excess as will keep the temperature at about 3500° absolute. While this is lower than the temperature which would result from an ideal fuel-air ratio, it is, nevertheless, extremely high and should be as high as can be permitted, consistent with the later attainment at the turbine vanes of a temperature which can be tolerated by the material thereof.

By the construction of the combustion chamber heretofore described it will be evident that though the temperature of the gases leaving the flame may be extremely high, nevertheless, effective cooling of the flame passage walls is maintained to prevent their destruction by reason of the progressive addition of air in the form of annular increments. According to the invention, therefore, an attempt is desirably made to secure at the inlets to the nozzles 146 the maximum temperature permissible in view of subsequent phases of the cycle. While excess air is added the quantity added is very much less than has been necessary in previously known cycles to avoid destructive temperatures at the turbine.

The expansion in the nozzles 146 takes place substantially adiabatically from the pressure delivered by the compressor to the pressure existing in the whirl passages 148. In the case of a unit of the type herein illustrated, the pressure in the whirl chamber may be about 0.85 of the atmospheric pressure under sea level operating conditions. Accordingly, what might be called superexpansion takes place with both the attainment of extremely high kinetic energy of the gas and with intense accompanying cooling. However, it will be evident that, particularly where there are no weight and space limitations of the type existing in aircraft applications, higher compression ratios may be desirable to secure still higher thermal efficiency and in such cases the expansion through the nozzles would only be carried far enough to achieve sufficiently low temperatures at the turbine vanes. The expansion, in other words, need not, in such cases, be carried to subatmospheric pressures.

The temperature of the gases issuing from the nozzles will normally still be far above a safe operating temperature for vanes of the best known materials. Accordingly, there occurs intense further cooling in the whirl chamber 148. This cooling, however, taking place at substantially constant pressure, is not accompanied by any substantial reduction of kinetic energy. It is presently well established that the transfer of heat between a flowing fluid and a solid wall increases with the relative velocity and that this still holds for extremely high velocities. In particular vortex cooling occurs with the advantages outlined above. An intense interchange of heat occurs from the whirling gases through the polished walls and fins to the air on the exterior of the whirl passage. Not only does this occur by reason of the long helical contact of the flowing gases with the walls of the whirl chamber but additionally by radiation to the walls, the conditions being ideal for such radiation. The resulting high transfer rate is sufficient to accomplish a lowering of temperature to a point at which the gases may safely be admitted to the turbine vanes. Even though the passage 148 may be of relatively short axial length, nevertheless, the path of flow of the gases passing therethrough is quite long because of the low pitch of the whirl.

The cooling, it is to be noted, does not represent a loss of useful energy of the gases. The kinetic energy, except for low frictional losses, is maintained. The heat transferred to the air is not lost because this raises the air temperature prior to the burning of the fuel to a quite high temperature so that the desired temperature at the inlets to the nozzles may be secured with corresponding economy of fuel, i. e., given a particular desired temperature at the nozzle entrances the fuel required to reach this temperature is less to the extent of the preheating of the air which supports the combustion.

There next occurs the flow of gases through the turbine which, through the first three sets of vanes, is, from an overall standpoint, approximately isothermal. Actually, however, the phases involved are relatively complicated and are as follows:

In the first set of vanes 156 approximately adiabatic compression takes place with resulting rise in temperature to a maximum value approximating the limiting temperature at which the vanes may permissibly operate. This temperature is the temperature for which the preceding matters of design are aimed, i. e., the combustion, the expansion and the cooling are so carried out that this maximum temperature is not exceeded. The adiabatic compression takes place with accompanying reduction of the peripheral components of the absolute velocity of the gases so that in leaving the vanes the whirl is substantially less than at the entrance. The result is the imparting of torque to the vanes to contribute to the drive of the turbine. As pointed out previously, the gases both entering and leaving the vanes desirably have vortex flow.

The gases now flow, still with a quite high whirl component, first inwardly and then outwardly through the passage 164, being cooled as they do so. During the period of reduction of the mean radius of flow some expansion occurs and then with increase of radius of flow there occurs compression. The net result, however, as viewed from the outlet of the vanes 156 to the inlet of the vanes 158, is an approximate cooling at constant pressure, the pressures at these two end points being substantially the same. Due to the high whirl component and radiation, there continues, however, the same general type of cooling as occurred in the whirl passage 148 so that at the entrance to the second set of vanes 158 the temperature is such that the compression occurring in these vanes will not result in the attainment of dangerous temperatures.

In passage through the vanes 158 essentially the same operations occur as through the vanes 156. Approximately adiabatic compression again occurs, the whirl velocities are still further reduced to impart driving torque to the vanes, and vortex flow is provided at the discharge. In the region 166 beyond the vanes 158 there is again expansion followed by compression accompanied by cooling in such fashion that at the entrance to the vanes 160 the pressure is approximately the same as at the exit from the vanes 158.

In the vanes 160 there is also approximately adiabatic compression, again with the attainment of a temperature which does not exceed a safe value. The region 168 into which the vanes 160 discharge with maintenance of vortex flow is of substantially constant mean radius so that the cooling which occurs in this passage is substantially at constant pressure without the expansion and compression previously referred to. The reason for this is that the temperature has now been so reduced that there is little point in securing the increase in velocity which has been achieved by the expansion in the regions 164 and 166, which increase of velocity contributes substantially to the heat transfer.

In the fourth row of vanes 162 expansion occurs rather than compression. At the exit from these vanes the gases still possess considerable kinetic energy and redirection of the gases takes place in the fixed blades 170, the gases being delivered to the vanes 172 of the final stage. The gases leaving the final stage may pass directly to the atmosphere, or through the nozzle 176 in which a final pressure drop occurs giving rise to a propulsion jet.

The advantages of the foregoing cycle will be made clear by reference to the temperature-entropy diagram of Figure 13 which is typical for the type of cycle involved. Compression occurs in the low pressure compressor A to B, the atmospheric line being represented by AX. Cooling takes place from B to C. This is followed by compression in the high pressure stages of the compressor from C to D. The compressions are approximately adiabatic but not strictly so in view of losses in the compressor stages.

Heating of the air then occurs, first by heat exchange and then by combustion of the fuel to raise the temperature along the constant pressure curve DE to the point E at the temperature T. The initial part of this curve may be taken to represent the lower heat reservoir for a succeeding part of the cycle which involves the cooling of the whirling gases issuing from the nozzles.

The approximately adiabatic expansion through the nozzles is represented by the line EF.

Following this the gases are cooled at substantially constant pressure in the whirl passage while their kinetic energy is maintained, cooling taking place along the subatmospheric pressure line FY to the point G.

In the first row of vanes of the negative-reaction type compression takes place from the point G to the point H.

HJ represents the expansion and recompression in the vortex space between the first and second rows of vanes. While this is taking place heat is continuously withdrawn and imparted partly to the compressed combustion air flowing through the fins on the outside of the vortex space and partly to the precompressed cooling air flowing along the interior surface of the turbine rotor. The compression which follows the initial expansion in the vortex space accordingly takes place at a lower temperature than the mean temperature prevailing during the expansion. If no friction losses occurred this phase of the cycle, involving compression under lower mean temperature conditions than those prevailing during the expansion, would result in a net pressure increase. However, unavoidable friction losses enter into the picture so that actually the pressure increase to the point J may merely involve a final pressure approximately that of the point H as indicated on the diagram.

In the second row of vanes compression takes place from J to K in a fashion similar to that occurring between G and H. Then in the following vortex chamber there is again expansion followed by compression along the line KL winding up approximately at the same pressure at L as at K.

In the third row of vanes compression takes place from L to M. This is followed by cooling from M to N at substantially constant pressure.

In the fourth row of vanes expansion takes place from N to O. At this point O the gases still possess considerable kinetic energy which, in the entropy diagram, is represented by the adiabatic line OP. Finally PQ represents the expansion line to atmospheric pressure representing the change of state occurring in the final pressure stage. In the event that a jet is provided this line also includes the change of state occurring in the jet. It may be noted that from G to P the overall process is approximately isothermal, and for a simplified view of the cycle it may be said that the cycle involves approximately isothermal compression through the first three sets of vanes.

The temperature T' of the point H, it will be noted, is the highest temperature involved in the cycle in the turbine blading. Actually, the turbine blading will not be subjected to an average temperature quite this high but rather to a temperature somewhere between the temperatures of the points G and H.

In comparison with this there may be considered the Brayton cycle which corresponds to a blade temperature of T'. This Brayton cycle would be represented by ABCDUVA, the zigzag line UV representing the process through the conventional type of turbine which, for the pressure ratio involved, would necessarily be of multistage type. It will be noted that the highest temperature involved at U must be much less than T. This requires in the conventional use of the Brayton cycle the introduction of sufficient excess air so that the temperature at the entrance to the nozzles is not higher than that at U. In comparison with this it will be seen that despite the heating of the gases to the much higher temperature corresponding to E, nevertheless by virtue of the superexpansion and the cooling along the line FG, the temperature of the vanes of the first set is maintained within the proper limit. At the same time there is transformed into useful energy the heat represented by the quite large area by which the present cycle area exceeds the Brayton cycle area.

The temperature-entropy diagram, however, does not tell the whole story inasmuch as for a given addition of heat by the fuel, representing the sole energy input to the power plant, the present cycle requires the handling of a much lower amount of air. In the case of the Brayton cycle between three and five times the amount of air would have to be handled.

Figure 13:
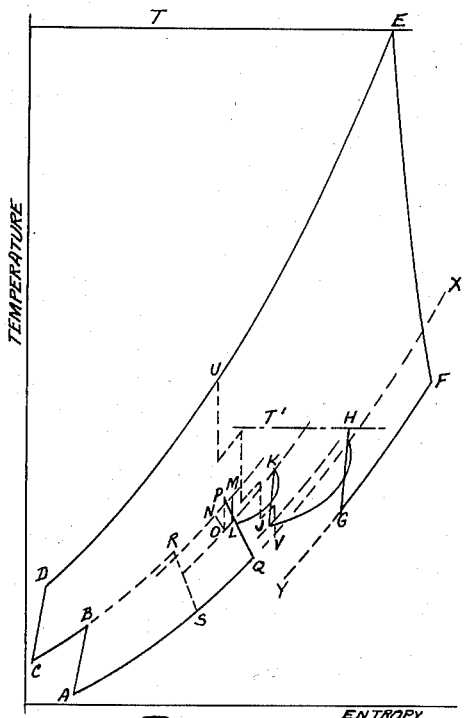
Figure 13 is a temperature-entropy diagram explanatory of the improved thermodynamic cycle.
Figure 6:
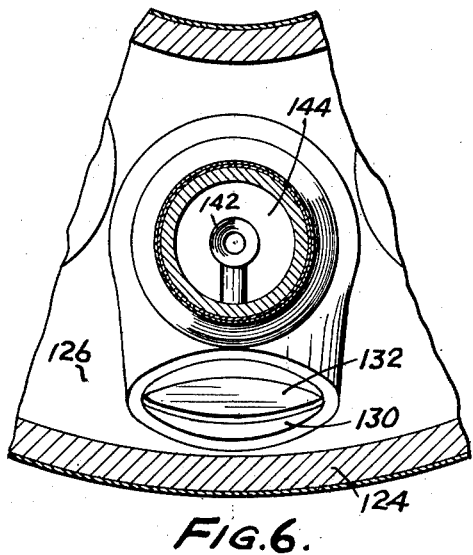
Figure 6 is a section taken on the plane indicated at 6—6 of Figure 1C.

The cooling air flowing through the rotor shell of the turbine involves a separate cycle of its own as shown at the lower left in Figure 13. Compression of this cooling air occurs in the low pressure stages of the compressor from A to B. It is then cooled in the intercooler from B to C, after which it is heated in the interior of the rotor from C to R. It is finally expanded along the line RS in the reaction nozzles located at 218 and in the stationary passages 220 and the blading of the final pressure stage. For cooling purposes the air used may be of the order of 20% of the main flow so that to determine the net power output of the cooling air in relation to the main cycle about one-fifth of the total area ABRS should be compared with the total area of the large diagram representing the main cycle.

The direct power output obtainable from the cooling air is, therefore, rather small. However, indirectly, the cooling air makes another contribution to the power output of the unit which is more substantial, increasing the area of the main cycle by contributing to making nearly isothermal the process from G to P. If this latter process was not isothermal a corresponding wedge would be deducted from the main cycle as will be evident from the diagram. In addition, a lower initial temperature T would have to be used in order to arrive at the same blade temperatures, which would lower the cycle efficiency.

From the foregoing it will be noted that the heat imparted to both the combustion air and the internal cooling air of the turbine is being used in a double fashion which is very important. The compressed combustion air and the cooling air constitute a lower heat reservoir for the cycle. Heat is accordingly withdrawn from the cycle in such a manner that the conversion of heat energy into mechanical energy is increased. The heat withdrawn from the cycle is then returned to the cycle in such manner that less heat must be added by fuel combustion, in the case of the combustion air, and a part of the heat withdrawn is converted into mechanical energy in the case of the cooling air.

While the present invention has been described in its preferred form, it will be evident that substantial advantages can be gained even by modifications thereof which do not attain the full valuable aspects of what is herein described.

For example, by the use of a negative-reaction turbine involving compression it would be possible to eliminate the cooling in the whirl chamber 148, directing the nozzle gases directly to the turbine. This possibility exists if a higher compression ratio is involved through the negative-reaction turbine to bring the output pressure of the turbine to the initial pressure (e. g., atmospheric pressure) without the use of a turbine stage involving a pressure drop. Under such circumstances the super-expansion alone may be used to provide a sufficient drop to a temperature which can be tolerated by the turbine vanes.

This will be evident from the temperature-entropy diagram constituting Figure 13.

Heat recovery from the exhaust gases may be effected in substantially conventional fashion for the purpose of driving an independent turbine or alternatively a turbine of conventional type which may be geared or directly connected to the main turbine.

It will be evident that the invention is applicable to a closed cycle type of operation in which a mass of air or other gases is continuously recirculated at increased pressures, heat being added to this air through heat exchange means without admixture with it of combustion gases. The heat in this case may be added by the combustion of fuel, electrically, or by the utilization of atomic energy.

Multiple staging of the system described, is of course, possible and advantageous in certain cases. For example, there may be cited the design of a gas turbine for a lower power output than that of the power plant described above, such as would be required for driving automotive vehicles, which design also illustrates the application of the invention to a system in which combustion or other heating of air takes place at atmospheric pressure and the cycle operates, in general, at subatmospheric pressures. For such an application a high starting torque is necessary (as compared with the plant heretofore described which may be started by auxiliary means, not shown, to give it an initial spin) which can only be obtained by separating the turbine driving an exhauster-compressor from the turbine delivering the useful mechanical output. Such an arrangement, for example, would consist of a negative-reaction turbine, the nozzle of which would receive gases substantially at atmospheric pressure and would expand the gases to a subatmospheric pressure, e. g., 0.2 atmosphere, in a whirl chamber cooled by the incoming air in its approach to the combustion chamber, this air also cooling the negative-reaction turbine in the fashion previously described. This turbine would drive a compressor and would discharge into the power turbine, which, in automotive applications, would be geared to the wheels. This power turbine would expand from approximately atmospheric pressure at the inlet to the power turbine nozzles, achieved by the pressure rise in the negative-reaction turbine, to subatmospheric pressure (e. g., 0.3 atmosphere) at the discharge. The gases leaving the power turbine would be cooled in a conventional heat exchanger and would then be recompressed to atmospheric pressure by the aforementioned exhauster-compressor. The power turbine may thus operate over a wide speed range starting from a standstill while the exhauster-compressor could operate continuously at full speed. The exhauster-compressor may be of the type of compressor herein described. The power turbine may be a conventional impulse or reaction turbine.

Figure 14:
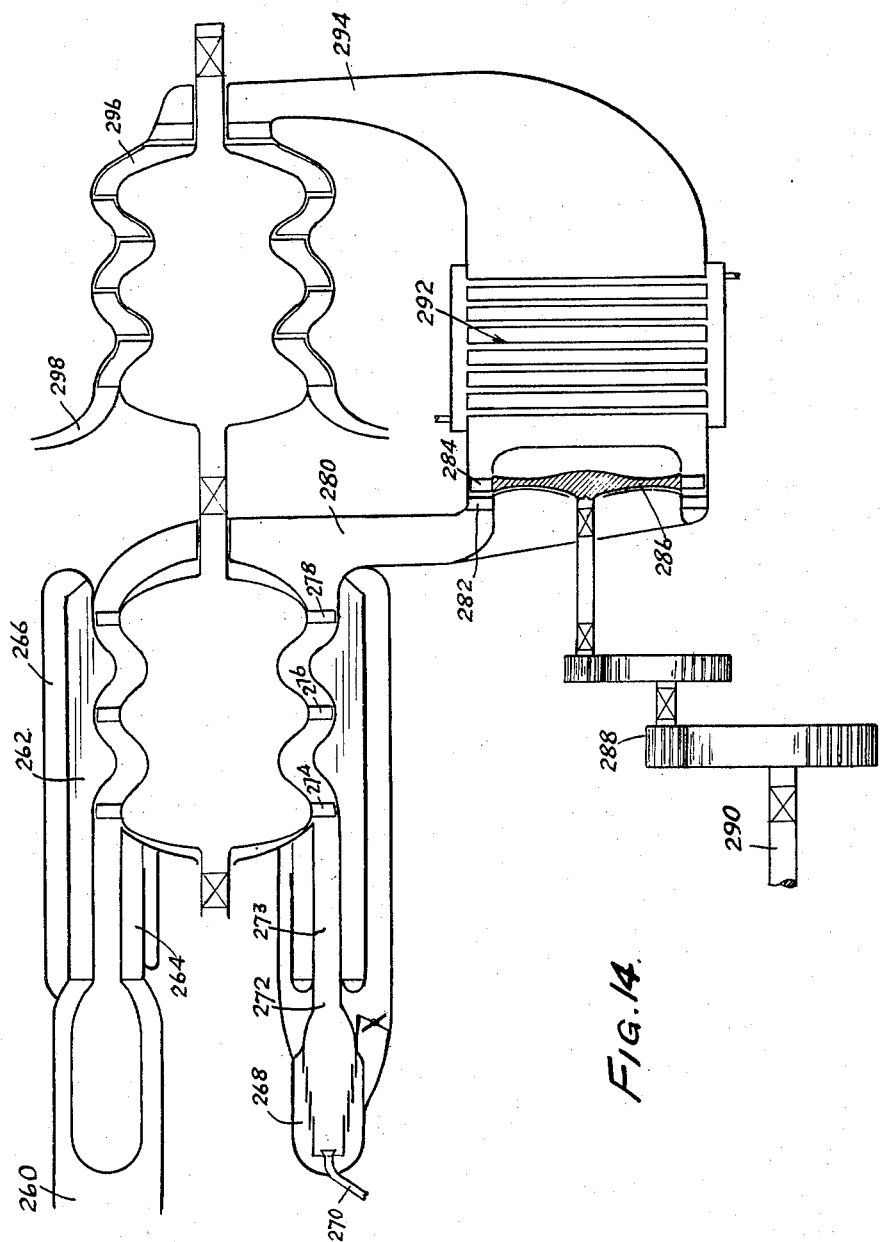
Figure 14 is a diagrammatic illustration of the application of the invention to a low power turbine plant operating at pressures below atmospheric pressure.

A power plant of the foregoing type is diagrammed in Figure 14. Air enters at 260 and passes through the heat exchange passages 262 and 264 of the type previously described and thence by way of the return passage 266 into the combustion chambers 268 into which fuel is injected at 270. The combustion products then expand through nozzles 272 into the whirl chamber 273 from which they flow through the vanes 274, 276 and 278 of the negative-reaction turbine. The gases exhausted from this turbine, now at approximately atmospheric pressure due to the compressor action, flow through the passage 280 and are expanded in the nozzles 282 cooperating with the blading 284 of the power turbine 286. This turbine, through reduction gearing 288, drives the power output shaft 290. The gases exhausted from the turbine 286 are then cooled in the exhaust gas cooler 292 in which the cooling medium may be water or air. The cool gases then flow through the passage 294 to the multiple stage compressor 296 of the type heretofore described, being discharged through the diffuser 298 to the atmosphere. As previously described, subatmospheric pressures exist in the whirl chamber and also on the exhaust side of the turbine 284. It will be evident that the mechanical construction, not shown in detail, is essentially similar to that of the aircraft power plant heretofore described in detail, with such modifications, as, for example, decrease of the number of nozzles, as are consistent with the lower power output. Various matters described herein are claimed in my applications Serial Numbers 38,995 and 73,977, filed, respectively, July 16, 1948 and February 1, 1949.

In view of the foregoing and other obvious modifications of the invention, it will be understood that the following claims should not be construed as limited to the particular preferred design herein described which is particularly adapted for aircraft use.

What I claim and desire to protect by Letters Patent is:

1. In combination, means for supplying high temperature elastic fluid, a turbine having rotating blading, a stationary nozzle receiving elastic fluid from said supplying means, expanding said fluid, and discharging said fluid at high velocity, means comprising solely stationary guiding walls for leading said fluid at substantially said high velocity from said nozzle to said turbine blading through an extended path longer than the diameter of the turbine blading, and means for leading elastic fluid in heat exchange relationship with the first mentioned fluid leading means and thence to said supplying means to effect substantial heat exchange between the elastic fluid streams flowing through the respective leading means.

2. In combination, means for supplying high temperature elastic fluid, a turbine having rotating blading, a stationary nozzle receiving elastic fluid from said supplying means, expanding said fluid, and discharging said fluid at high velocity, means comprising solely stationary guiding walls for leading said fluid at substantially said high velocity from said nozzle to said turbine blading through an extended path longer than the diameter of the turbine blading, and means for leading elastic fluid in heat exchange relationship with the first mentioned fluid leading means and thence to said supplying means to effect substantial heat exchange between the elastic fluid streams flowing through the respective leading means, said turbine having at least one compressor stage so that flow occurs therein with a rise of pressure of the first mentioned fluid.

3. In combination, means for supplying high temperature elastic fluid, a turbine, an annular whirl chamber, a nozzle receiving elastic fluid from said supplying means and discharging said fluid in skew direction into said whirl chamber, the nozzle being of a type effecting expansion and high velocity of discharge of the elastic fluid so that the discharged fluid has a helical path in the whirl chamber and flows therein at high velocity, said whirl chamber being constructed and arranged to lead said fluid to the turbine, and means for leading elastic fluid in heat exchange relationship with said whirl chamber and thence to said supplying means to effect heat exchange between the elastic fluid flowing through the whirl chamber and the elastic fluid flowing through said leading means.

4. In combination, means for supplying high temperature elastic fluid, a turbine, an annular whirl chamber, a nozzle receiving elastic fluid from said supplying means and discharging said fluid in skew direction into said whirl chamber, the nozzle being of a type effecting expansion and high velocity of discharge of the elastic fluid so that the discharged fluid has a helical path in the whirl chamber and flows therein at high velocity, said whirl chamber being constructed and arranged to lead said fluid to the turbine, and means for leading elastic fluid in heat exchange relationship with said whirl chamber and thence to said supplying means to effect heat exchange between the elastic fluid flowing through the whirl chamber and the elastic fluid flowing through said leading means, said turbine having at least one compressor stage so that flow occurs therein with a rise of pressure of the first mentioned fluid.

5. In combination, a combustion chamber, a turbine having rotating blading, means for delivering fuel to said combustion chamber, a stationary nozzle receiving gases from said combustion chamber, expanding said gases, and discharging said gases at high velocity, means comprising solely stationary guiding walls for leading said discharged gases at substantially said high velocity from said nozzle to said turbine blading through an extended path longer than the diameter of the turbine blading, and means for leading air in heat exchange relationship with the first mentioned leading means and thence to the combustion chamber to effect substantial heat exchange between the gases and the air passing through the respective leading means.

6. In combination, a combustion chamber, a turbine having rotating blading, means for delivering fuel to said combustion chamber, a stationary nozzle receiving gases from said combustion chamber, expanding said gases, and discharging said gases at high velocity, means comprising solely stationary guiding walls for leading said discharged gases at substantially said high velocity from said nozzle to said turbine blading through an extended path longer than the diameter of the turbine blading, and means for leading air in heat exchange relationship with the first mentioned leading means and thence to the combustion chamber to effect substantial heat exchange between the gases and the air passing through the respective leading means, said turbine having at least one compressor stage so that flow occurs therein with a rise of pressure of said gases.

7. In combination, a combustion chamber, a turbine, means for delivering fuel to said combustion chamber, an annular whirl chamber, a nozzle receiving gases from said combustion chamber and discharging said gases in skew direction into said whirl chamber, the nozzle being of a type effecting expansion and high velocity of discharge of the gases so that the discharged gases have a helical path in the whirl chamber and flow therein at high velocity, said whirl chamber being constructed and arranged to lead the gases to said turbine, and means for leading air in heat exchange relationship with said whirl chamber and thence to the combustion chamber to effect heat exchange between the gases passing through the whirl chamber and said air.

8. In combination, a combustion chamber, a turbine, means for delivering fuel to said combustion chamber, an annular whirl chamber, a nozzle receiving gases from said combustion chamber and discharging said gases in skew direction into said whirl chamber, the nozzle being of a type effecting expansion and high velocity of discharge of the gases so that the discharged gases have a helical path in the whirl chamber and flow therein at high velocity, said whirl chamber being constructed and arranged to lead the gases to said turbine, and means for leading air in heat exchange relationship with said whirl chamber and thence to the combustion chamber to effect heat exchange between the gases passing through the whirl chamber and said air, said turbine having at least one compressor stage so that flow occurs therein with a rise of pressure of said gases.

9. In combination, a compressor, a combustion chamber, a turbine having rotating blading, means for delivering fuel to said combustion chamber, a stationary nozzle receiving gases from said combustion chamber, expanding said gases, and discharging said gases at high velocity, means comprising solely stationary guiding walls for leading said discharged gases at substantially said high velocity from said nozzle to said turbine blading through an extended path longer than the diameter of the turbine blading, and means for leading air from the compressor in heat exchange relationship with the first mentioned leading means and thence to the combustion chamber to effect substantial heat exchange between the gases and the air passing through the respective leading means.

10. In combination, a compressor, a combustion chamber, a turbine having rotating blading, means for delivering fuel to said combustion chamber, a stationary nozzle receiving gases from said combustion chamber, expanding said gases, and discharging said gases at high velocity, means comprising solely stationary guiding walls for leading said discharged gases at substantially said high velocity from said nozzle to said turbine blading through an extended path longer than the diameter of the turbine blading, and means for leading air from the compressor in heat exchange relationship with the first mentioned leading means and thence to the combustion chamber to effect substantial heat exchange between the gases and the air passing through the respective leading means, said turbine having at least one compressor stage so that flow occurs therein with a rise of pressure of said gases.

11. In combination, a compressor, a combustion chamber, a turbine, means for delivering fuel to said combustion chamber, an annular whirl chamber, a nozzle receiving gases from said combustion chamber and discharging said gases in skew direction into said whirl chamber, the nozzle being of a type effecting expansion and high velocity of discharge of the gases so that the discharged gases have a helical path in the whirl chamber and flow therein at high velocity, said whirl chamber being constructed and arranged to lead the gases to said turbine, and means for leading air from the compressor in heat exchange relationship with said whirl chamber and thence to the combustion chamber to effect heat exchange between the gases passing through the whirl chamber and said air.

12. In combination, a compressor, a combustion chamber, a turbine, means for delivering fuel to said combustion chamber, an annular whirl chamber, a nozzle receiving gases from said combustion chamber and discharging said gases in skew direction into said whirl chamber, the nozzle being of a type effecting expansion and high velocity of discharge of the gases so that the discharged gases have a helical path in the whirl chamber and flow therein at high velocity, said whirl chamber being constructed and arranged to lead the gases to said turbine, and means for leading air from the compressor in heat exchange relationship with said whirl chamber and thence to the combustion chamber to effect heat exchange between the gases passing through the whirl chamber and said air, said turbine having at least one compressor stage so that flow occurs therein with a rise of pressure of said gases.

13. In combination, a compressor, a combustion chamber, a turbine, means for delivering fuel to said combustion chamber, an annular whirl chamber, a nozzle receiving gases from said combustion chamber and discharging said gases in skew direction into said whirl chamber, the nozzle being of a type effecting expansion and high velocity of discharge of the gases so that the discharged gases have a helical path in the whirl chamber and flow therein at high velocity, said whirl chamber being constructed and arranged to lead the gases to said turbine, and means for leading air from the compressor in heat exchange relationship with said whirl chamber and thence to the combustion chamber to effect heat exchange between the gases passing through the whirl chamber and said air, said turbine having at least one compressor stage so that flow occurs therein with a rise of pressure of said gases, whereby said whirl chamber is at a pressure less than that at which the compressor receives air.

RUDOLPH BIRMANN.

REFERENCES CITED

The following references are of record in the file of this patent:

UNITED STATES PATENTS

| Number | Name | Date |
| --- | --- | --- |
| 1,421,632 | Wedig | July 4, 1922 |
| 1,960,810 | Gordon | May 29, 1934 |
| 2,056,198 | Lasley | Oct. 6, 1936 |
| 2,078,956 | Lysholm | May 4, 1937 |
| 2,080,425 | Lysholm | May 18, 1937 |
| 2,110,209 | Engels | Mar. 8, 1938 |
| 2,234,733 | Jendrassik | Mar. 11, 1941 |
| 2,242,767 | Traupel | May 20, 1941 |
| 2,243,467 | Jendrassik | May 27, 1941 |
| 2,244,467 | Lysholm | June 3, 1941 |
| 2,314,058 | Stalker | Mar. 16, 1943 |
| 2,333,053 | Stroehlen | Oct. 26, 1943 |
| 2,365,046 | Bottomley | Dec. 12, 1944 |
| 2,404,335 | Whittle | July 16, 1946 |
| 2,461,186 | Seippel | Feb. 8, 1949 |

FOREIGN PATENTS

| Number | Country | Date |
| --- | --- | --- |
| 337,687 | Great Britain | Nov. 6, 1930 |
| 387,264 | Great Britain | Feb. 2, 1933 |
| 346,599 | Germany | Jan. 5, 1922 |